United States Patent
Hebert et al.

(10) Patent No.: US 11,010,385 B2
(45) Date of Patent: May 18, 2021

(54) DATA SECURITY THROUGH QUERY REFINEMENT

(71) Applicant: SAP SE, Walldorf (DE)

(72) Inventors: Cedric Hebert, Mougins (FR); Manuel Karl, Karlsruhe (DE)

(73) Assignee: SAP SE, Walldorf (DE)

( * ) Notice: Subject to any disclaimer, the term of this patent is extended or adjusted under 35 U.S.C. 154(b) by 118 days.

(21) Appl. No.: 16/598,473

(22) Filed: Oct. 10, 2019

(65) Prior Publication Data
US 2021/0109931 A1    Apr. 15, 2021

(51) Int. Cl.
*G06F 16/242* (2019.01)
*G06F 16/2453* (2019.01)
*G06F 16/248* (2019.01)
*G06F 21/62* (2013.01)
*G06F 40/221* (2020.01)

(52) U.S. Cl.
CPC ...... *G06F 16/24545* (2019.01); *G06F 16/248* (2019.01); *G06F 16/2425* (2019.01); *G06F 21/6227* (2013.01); *G06F 40/221* (2020.01)

(58) Field of Classification Search
CPC ............. G06F 16/24545; G06F 40/221; G06F 21/6227; G06F 16/2425; G06F 16/248
See application file for complete search history.

(56) References Cited

U.S. PATENT DOCUMENTS

| | | | |
|---|---|---|---|
| 6,609,123 B1 * | 8/2003 | Cazemier | G06F 16/289 |
| 6,820,082 B1 * | 11/2004 | Cook | G06F 21/6227 707/754 |
| 7,437,362 B1 * | 10/2008 | Ben-Natan | G06F 21/6227 |
| 2002/0062449 A1 * | 5/2002 | Perna | G06F 21/629 726/26 |
| 2005/0289144 A1 * | 12/2005 | Dettinger | G06F 21/6227 |
| 2007/0027880 A1 * | 2/2007 | Dettinger | G06F 21/6227 |
| 2008/0256172 A1 | 10/2008 | Hebert et al. | |
| 2009/0077376 A1 | 3/2009 | Montagut et al. | |
| 2009/0222399 A1 | 9/2009 | Gomez et al. | |
| 2009/0228440 A1 * | 9/2009 | Leff | G06F 21/6227 |
| 2009/0327317 A1 | 12/2009 | Ulmer et al. | |
| 2010/0030737 A1 * | 2/2010 | Scheuber-Heinz | G06F 21/6227 707/783 |
| 2011/0313981 A1 * | 12/2011 | Ben-Natan | G06F 21/6227 707/694 |
| 2012/0042364 A1 | 2/2012 | Hebert | |
| 2013/0160079 A1 | 6/2013 | Hebert | |
| 2013/0262397 A1 | 10/2013 | Hebert | |

(Continued)

OTHER PUBLICATIONS

Sanchez-Rola et al., "Clock Around the Clock: Time-Based Device Fingerprinting", Oct. 2018, ACM SIGSAC Conference, 13 pgs.

(Continued)

*Primary Examiner* — Jorge A Casanova
(74) *Attorney, Agent, or Firm* — Klarquist Sparkman, LLP

(57) ABSTRACT

Systems, methods, and computer media for securing data accessible through software applications are provided herein. By capturing path data such as returned results for a query and displayed results provided by an application (e.g., to or by a web browser) for an operation, it can be determined if the query returned more data than was needed for what was displayed. The query can be refined to limit the data returned and reduce the security risk of such over-provisioning of data.

20 Claims, 7 Drawing Sheets

(56) References Cited

U.S. PATENT DOCUMENTS

| | | |
|---|---|---|
| 2014/0372927 A1 | 12/2014 | Hebert et al. |
| 2015/0033346 A1 | 1/2015 | Hebert et al. |
| 2016/0078234 A1 | 3/2016 | Li et al. |
| 2016/0099953 A1 | 4/2016 | Hebert et al. |
| 2016/0112376 A1 | 4/2016 | Gomez et al. |
| 2016/0306965 A1* | 10/2016 | Iyer ................. G06Q 10/105 |
| 2017/0019421 A1 | 1/2017 | Hebert et al. |
| 2017/0169217 A1 | 6/2017 | Rahaman et al. |
| 2017/0177308 A1 | 6/2017 | Montagnon et al. |
| 2017/0177310 A1 | 6/2017 | Mathias et al. |
| 2018/0004978 A1 | 1/2018 | Hebert et al. |
| 2018/0041546 A1 | 2/2018 | Gomez et al. |
| 2018/0077174 A1 | 3/2018 | Hebert |
| 2019/0082305 A1* | 3/2019 | Proctor ................. H04W 12/10 |

OTHER PUBLICATIONS

"Observations From the Front Lines of Threat Hunting: A 2018 Mid-Year Review From Falcon OverWatch", https://go.crowdstrike.com/rs/281-OBQ-266/images/Report2018OverwatchReport.pdf, 20 pgs.

"The RASP market size is expected to grow from USD 294.7 million in 2017 to USD 1, 240.1 million by 2022, at a Compound Annual Growth Rate (CAGR) of 33.3%", https://www.prnewswire.com/news-releases/the-rasp-market-size-is-expected-to-grow-from-usd-2947-million-in-2017-to-usd-12401-million-by-2022-at-a-compound-annual-growth-rate-cagr-of-333-300578893.html, Jan. 8, 2018, 4 pgs.

Canarytokens by Thinkst, https://canarytokens.org/generate, accessed Aug. 13, 2019, 1 pg.

AppSensor DetectionPoints, https://www.owasp.org/index.php/AppSensor_DetectionPoints, accessed Aug. 13, 2019, 38 pgs.

* cited by examiner

DATA SECURITY THROUGH QUERY REFINEMENT

BACKGROUND

Securing computer systems, applications, and data has become an increasingly difficult task. In addition to attackers exploiting software bugs and vulnerabilities and unauthorized or malicious use of valid credentials, in some cases applications themselves inadvertently provide unnecessary access to data. Detecting and managing such access is challenging.

DETAILED DESCRIPTION

Figure 1:
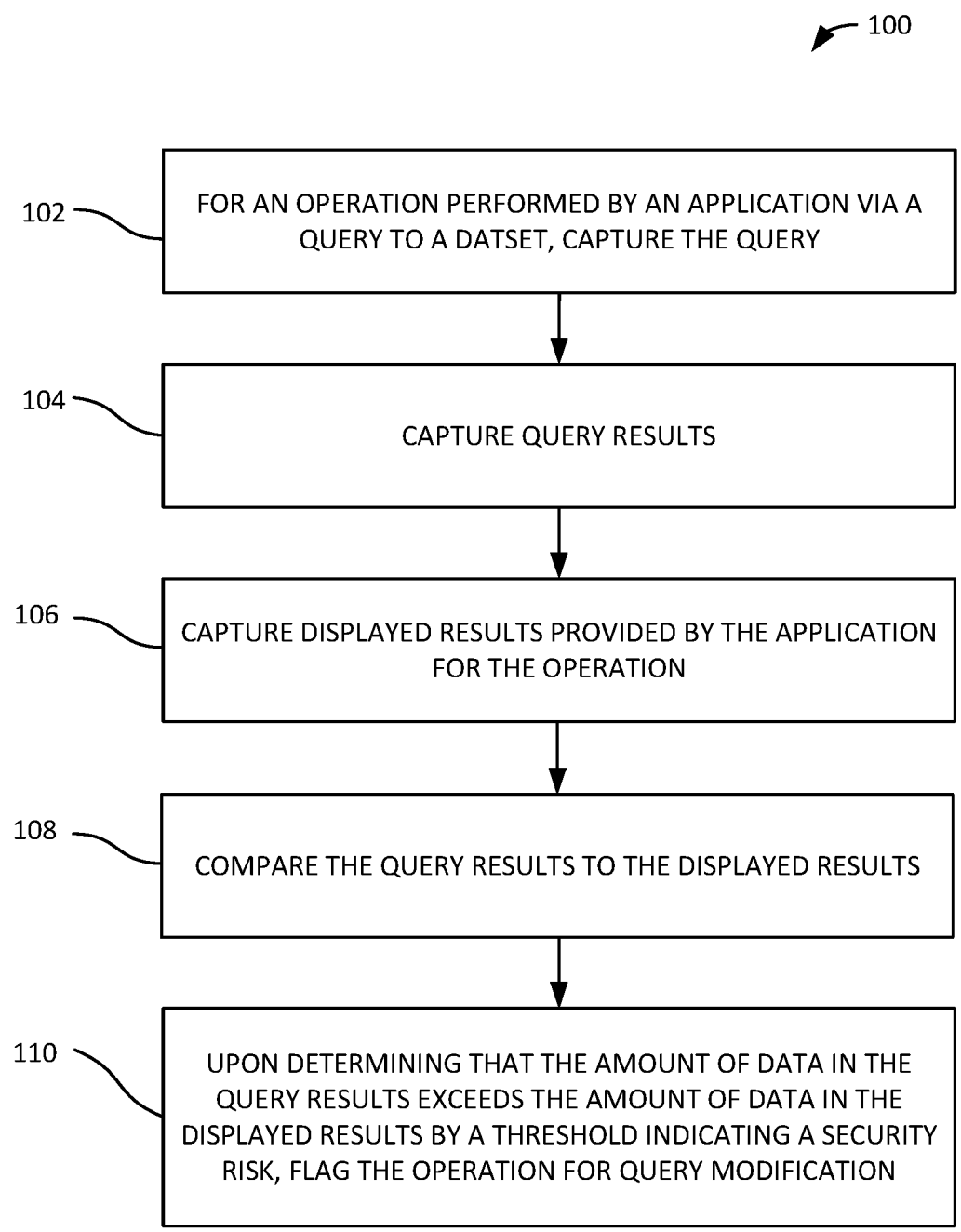
FIG. 1 illustrates an example method of securing data accessible by an application.

The examples described herein generally secure data accessible through software applications. Interaction with applications often involves operations causing a data store to be queried. By capturing returned results for a query and capturing displayed results provided by the application (e.g., to a web browser) for the operation, it can be determined if the query returned more data than was needed for what was actually displayed. Such situations can be security risks, and the query can be refined to limit the data returned and reduce the security risk.

In a specific web application example, a user interacts with an application through a browser, and the application queries data in a database through an Application Programming Interface (API) or database engine. The API or database engine provides query results to the application, and the application provides information to the browser. Frequently, more data is accessed and returned from the database than is ultimately provided to the browser. For example, an application may omit certain fields or other aspects from query results before providing the data to the browser. By capturing and comparing information at different stages, over-provisioning of data can be detected and remedied.

In the web application context, query results (e.g., JavaScript Object Notation (JSON) files) can be compared with data from the database that is included in HTML sent to and/or displayed by the web browser. If the query results contain more data than what is displayed by the browser (e.g., more data beyond a threshold amount), then the query (e.g., a Structured Query Language (SQL) statement) can be refined so that when the operation is performed by the application in the future, less data will be returned. As specific examples of refinement, SQL statements can be narrowed or modified to only retrieve information from a current user rather than a group of users or modified to retrieve particular fields or subsets of data that are ultimately displayed by the browser rather than all fields for a record.

Identifying data over-provisioning and refining queries can be done in an iterative manner such that after a refined query has been generated, the refined query is then treated as the initial query and evaluated to determine whether it still over-provides data. Iteration can continue, for example, until a refined query reduces the amount of data over-provisioning to within an acceptable threshold or until a certain number of iterations have not resulted in further improvement. In some examples, security alerts can be generated to inform developers of over-provisioning, lack of improvement through the refinement process, return of erroneous or problematic data (e.g., return of no data or return of data for other users in addition to data for the user) after query refinement, or other issues.

The described approaches to securing data identify and mitigate the potential security risk of over-provisioning of data. Through query refinement, applications can be tested, monitored, and modified to strengthen data and application security. Examples are described below with reference to FIGS. 1-7.

FIG. 1 illustrates an example method 100 of securing data accessible by an application. In process block 102, for an operation performed by the application via a first query to a dataset, the first query is captured. The query can be formulated by the application as, for example, a SQL query. The application can interact with the dataset through an API or database engine. The dataset can be stored in a database or other data store. In process block 104, returned results of the first query are captured. Returned results can be JavaScript Object Notation (JSON) files or other formats.

In process block 106, displayed results provided by the application for the operation are captured. The displayed results can be, for example, what is transmitted from the application to a browser or other software for display. The displayed results can also be what is displayed on a screen. Displayed results can be determined, for example, by parsing an HTML file and identifying data from the dataset in the HTML file. In some examples, tags or other identifiers can be associated with data returned from the dataset so that the HTML file can be searched for tagged data.

In process block 108, the returned results of the first query are compared to the displayed results. The comparison can be based on the stored size of the data, number of data items/records, lines of data, or other metric. In process block 110, upon determining that an amount of data from the dataset in the returned results of the first query exceeds an amount of data from the dataset in the displayed results by a threshold amount indicating a security risk, the operation is flagged for query modification to reduce the amount of data from the dataset in subsequent returned results corresponding to the operation. In some examples, the threshold indicating a security risk is anything greater than zero, in which case any difference in the amount of data between the returned results and the displayed results is flagged for query modification. In other examples, a numerical or percentage threshold (e.g., 5%, 10%, 20% greater, etc.) is used.

In some examples, responsive to the flagging, and based at least in part on the displayed results, the first query is modified to create a refined query. The first query can be modified by, for example, narrowing or modifying an SQL statement (e.g., a "SELECT" command) to only retrieve information from a current user rather than a group of users or to retrieve particular fields or subsets of data that are ultimately displayed rather than all fields for a record. Modifying the query is intended to reduce the amount of data returned to an amount nearer to what is displayed than what was previously returned for the query. The refined query can replace the first query for use with the operation in the application. In this way, once the security risk of over-provisioning of data is identified for an operation, future performance of the operation will return less data, reducing the security risk.

In some examples, the refined query is executed against the dataset, and the returned results of the refined query are evaluated. This provides a check to verify that the refined query did in fact return less data than the first query. In some examples, the refined query is executed before it replaces the initial query. The results of the refined query can be evaluated by comparing them to either or both the returned results of the first query or the displayed results. In some examples, the results of the refined query are compared to the returned results of the first query, and if there is less data returned by the refined query, the refined query replaces the first query.

An iterative approach can be taken in which the refined query is then treated as the first query and is evaluated again against the threshold, and if comparison against the threshold indicates a security risk, the first refined query can be modified to form a second refined query. Upon determining that results for the second refined query reduce the security risk, the refined query can be replaced by the second refined query. This process can continue either for a specified number of iterations, until newly generated refined queries stop resulting in improvement, or until an amount of data below the threshold is returned.

Over-reduction in the provision of data can also occur. In a situation where a query is refined, executed, and compared to the results of the initial query, the refined query could at first appear to be an improvement but could in fact return less data than the displayed results, indicating that some data has been left out. In some examples, such over-reduction can cause generation of an alert or cause the previous query refinement iteration (or entire refinement process) to revert to the last known state in which the displayed results were smaller than the query results.

In some examples, security alerts are generated and transmitted to developers or technical staff if continued iteration is unsuccessful at reducing the amount of data in returned results to an acceptable level (e.g., to below the threshold). Generation and transmission of security alerts can also be part of flagging the operation for query modification. In some examples, method 100 is performed once, and upon determining that an amount of data from the dataset in the results of the refined query exceeds the amount of data from the dataset in the displayed results by more than the threshold amount indicating the security risk, a security alert is generated.

Figure 2:
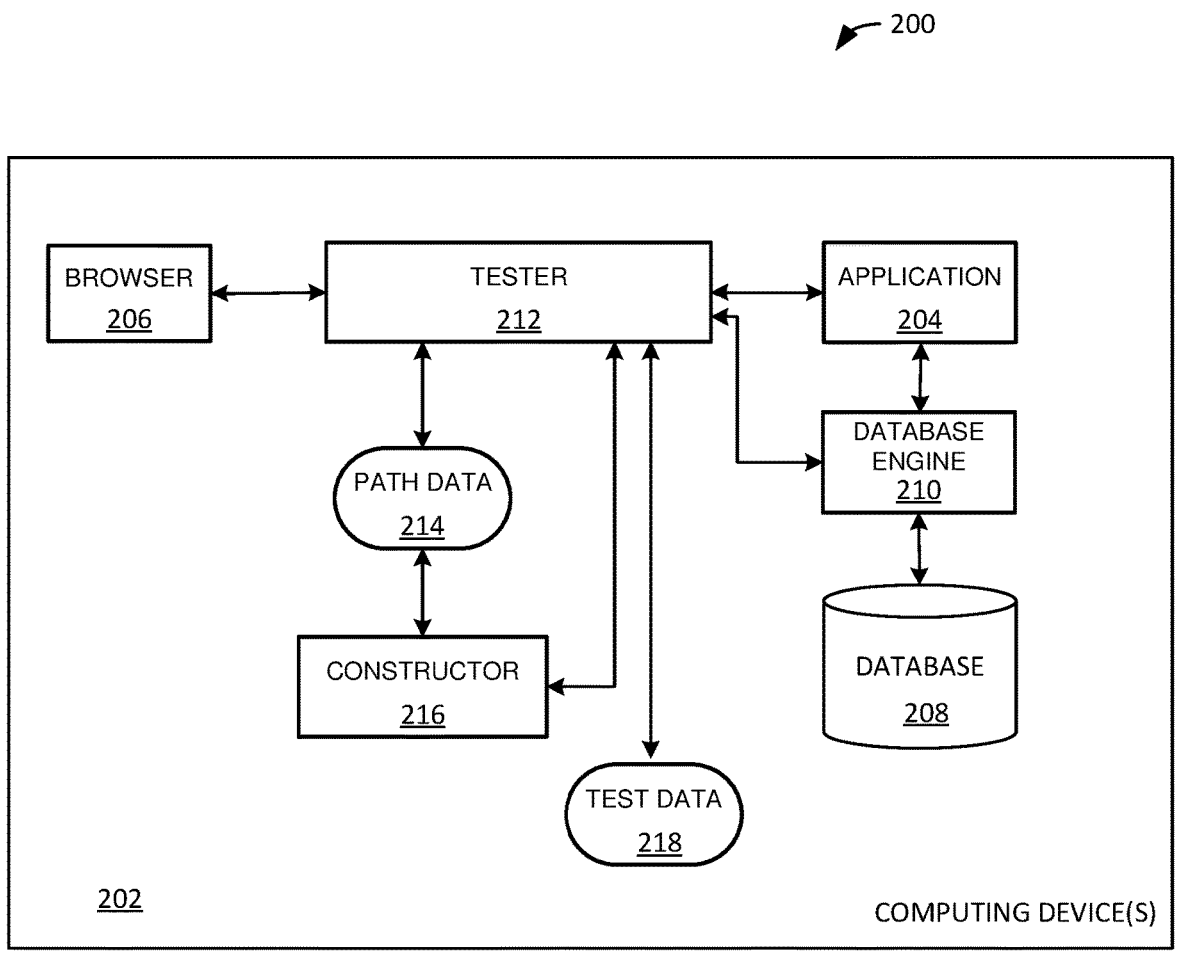
FIG. 2 is an example data security system configured to construct refined queries.

FIG. 2 illustrates a system 200 for securing data implemented on one or more computing devices 202. System 200 is configured to construct refined queries, and can, for example, implement method 100 of FIG. 1. A user interacts with application 204 through browser 206 and can instruct application 204 to perform various operations. Operations can be performed through one or more queries to database 208 through database engine 210. In some examples, queries are made through an API (not shown) and then to database engine 210. In examples where other data stores are used, database engine 210 can be replaced by an API or other interface or application 204 can query database 208 directly. As an example user action, if a user navigates to his profile page while interacting with application 204 through browser 206, application 204 sends a query to database engine 210 requesting profile data that corresponds to the user, and the desired data is accessed from database 208, returned to application 204, and provided to browser 206.

Tester 212 captures path data 214 and communicates path data 214 to constructor 216. Path data 214 represents interactions among application 204 and other components such as browser 206, database engine 210, an API (not shown), and database 208 or other data store. Path data 214 includes queries submitted by database engine 210 to database 208, query results returned to application 204 by database engine 210, and displayed results provided by application 204 for browser 206. Other examples of path data include commands made by an API in response to queries made by application 204, information representing a response sent by the API to application 204, and information sent to browser 206 by application 204. Specific examples of path data 214 can include HyperText Transfer Protocol (HTTP) requests from browser 206, SQL commands generated by application 204 or database engine 210, JSON files returned to application 204, and HTML files provided to or generated by browser 206.

Figure 4:
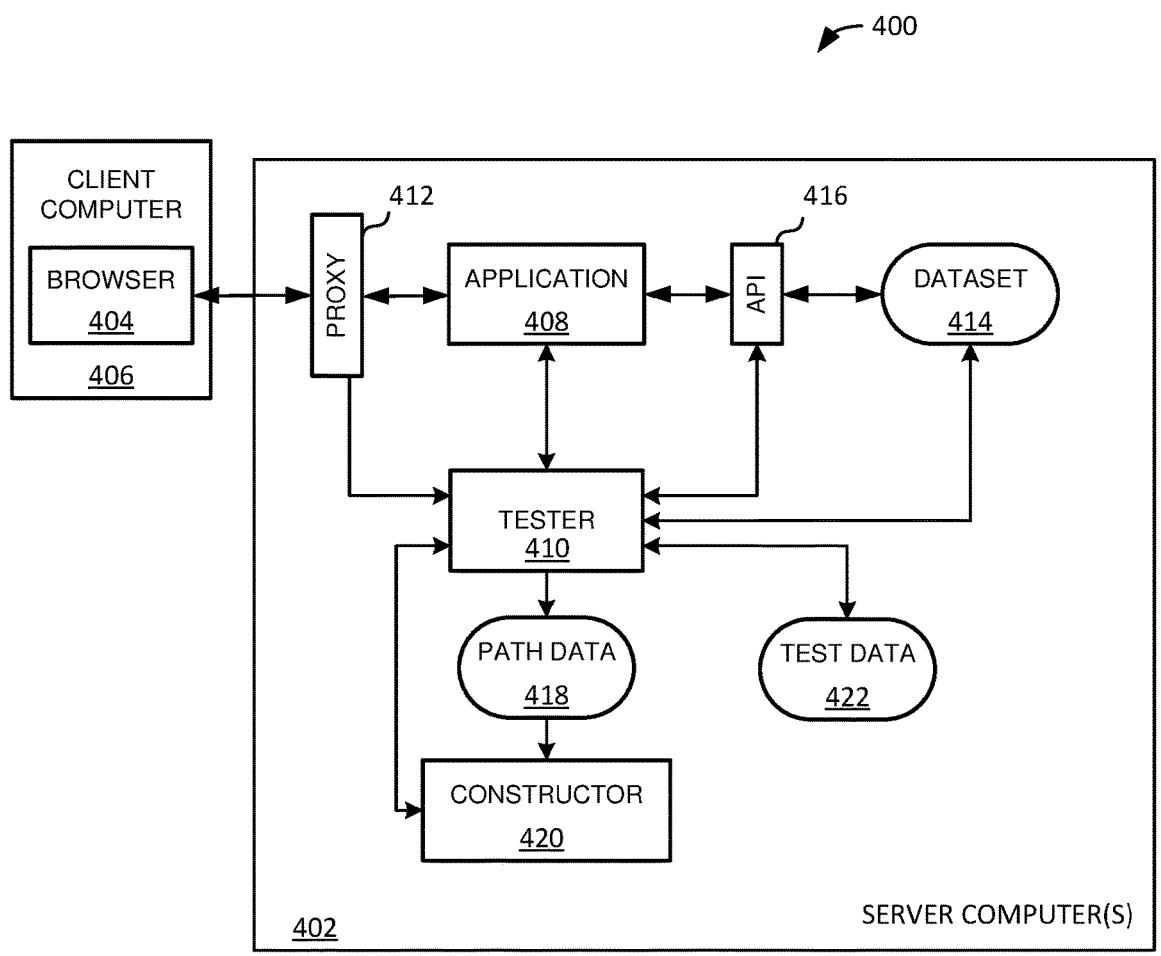
FIG. 4 is an example data security system in which a browser on a client computer interacts with an application on one or more server computers.

In system 200, application 204 communicates directly with database engine 210. FIG. 4 illustrates an example system that includes an API. Returning to FIG. 2, system 200 can be used, for example, as an application test system where over-provisioning of data can be identified in a controlled environment. In many cases, if a query successfully returns the desired information, it remains unknown that unnecessary data was returned in query results. Thus, the application appears to be working properly, but the over-provisioning of data creates a security risk. Such over-provisioning can be identified using system 200 by monitoring path data 214. In system 200, tester 212 has access to browser 206. In other examples, browser 206 is on a remote computing device, and path data 214 will include information sent to browser 206. In some examples, software on the user end will capture browser information and provide it to tester 212.

Constructor 216 uses path data 214 to create refined queries. Consider an example with a user "Don" logged in to application 204 through browser 206. Don requests to view his profile, resulting in a "GET/myprofile" command generated by application 204 which triggers the SQL statement query "SELECT * FROM USERS." The SQL statement can be generated by application 204 or through an API and is captured by tester 212. This query results in all information about all users being retrieved. An example of returned results, which are captured by tester 212, in JSON format for a database having four users is:

```
[
    {
        "id": 1,
        "user": "Alice",
        "address": "123 main street"
    },
    {
        "id": 2,
        "user": "Bob",
        "address": "234 hauptstrasse"
    },
    {
        "id": 3,
        "user": "Charlie",
        "address": "345 boulevard Carnot"
    },
    {
```

```
        "id": 4,
        "user": "Don",
        "address": "456 chinatown"
    }
]
```

Application 204, however, is configured to only provide the name of the current user, so what is communicated to and displayed in browser 206, and that is also captured by tester 212, is {"name":"Don"}. Comparison of the returned results for the query (information for Alice, Bob, Charlie, and Don) with what is displayed (Don's name) reveals that far more data has been returned by the query than was needed for what was displayed, indicating a security risk by unnecessarily accessing and providing the data about the other users as well as unneeded information about Don. Path data 214 includes the query, the returned query results, and the displayed results. Path data 214 can also include other information such as the "GET" command that caused the query to be initiated.

Tester 212 can use different metrics to compare the returned query results with the displayed results. For example, tester 212 can determine that information for multiple users was returned and information for only one user was displayed, indicating a security risk and causing the operation (displaying profile) to be flagged for query modification. Tester 212 can also compare the one displayed data record to the twelve returned data records in the query results and determine that the difference of eleven records is over a threshold.

Constructor 216 modifies the query to reduce or eliminate the security risk by returning less data. In this example, constructor 216 can narrow the "SELECT" statement by providing arguments to align the returned results with the displayed results, such as "SELECT name FROM USERS WHERE 'user'='Don'". Tester 212 can replace the initial query with the refined query. In some examples, the refined query is stored in test data 218 and is executed against database 208 to verify that the expected result of "{"name": "Don"}" is returned. The results of executing the refined query can also be stored in test data 218. In some examples, the refined query automatically replaces the initial query. In other examples, an alert is generated to request manual approval by a developer or other technical staff. The initial query can be stored in case usage of the refined query identifies a problem so that application 204 can revert to the initial query.

As an example of such problems, if a different user, Alice, logs in to application 204 and tries to access her profile, "GET/myprofile" initiates a query of "SELECT name FROM USERS WHERE 'user'='Don'" (the refined query). The query refinement process that occurred after comparing the returned results and displayed results for Don resulted in an overly specific query that for Alice returns nothing. In this case, an alert can be generated and manual intervention by technical staff can be requested. In some examples, the application will revert to the initial query "SELECT * FROM USERS." In some examples, constructor 216 can be notified by application 204 to retain certain fields or other aspects of data or not modify the query to include certain fields. As an example, constructor 216 can be instructed to not simplify to a specific name and instead simplify to "WHERE 'user'='current user'".

As another example, consider application 204 as a human resources application in which a user requests to access an employee record for an employee named Rhett Moscieski. Application 204 executes "GET/hr?employee="Rhett Moscieski" ", which initiates the SQL query "SELECT * FROM employees e, departments d, employee_types et WHERE e.department=d.id AND e.empoyeeType=et.id AND e.firstname="Rhett" AND e.lastname="Moscieski" ". The returned query results are:

```
[
    {
        "id": 4562312,
        "firstname": "Rhett",
        "lastname": "Moscieski",
        "street": "123 main street",
        "city": "Karlsruhe",
        "zip": "123456",
        "state": "BW",
        "employee_Duration": 5,
        "office": "Karlsruhe",
        "department_id": 10,
        "hr_responsible": 20
    }
]
```

Application 204 then provides the following displayed results to browser 206:

```
[
{"firstname":"Rhett",
"lastname": "Moscieski",
"department": "security",
"headof": "Don Mitchell",
"employee_type": "hourly wage earner"}
]
```

Tester 212 compares the two and the eleven returned data items are more than the five displayed data items, so constructor 216 refines the query to select particular items rather than all items: "SELECT e.firstname, e.lastname, d.name, d.headof, et.name FROM employees e, departments d, employee_Types et WHERE e.department=d.id AND e.empoyeeType=et.id AND e.firstname="Rhea" AND e.lastname="Moscieski" ". The refined query now returns the same amount of data as the displayed results. As with the previous example, rather than specifying the person's name, a more general refined query can be created by using "$firstname" and "$lastname". In some examples, query refinement is user specific and the refined queries are stored in association with the user's profile.

As another example, object-relational mapping frameworks can be configured, either for performance enhancement reasons or by mistake, in an "eager mode" that can cause more data than necessary to be pulled. Such queries can be refined to make them "lazy" such that the queries only access data that is needed for display or as intermediate information for displayed information (e.g., numbers on which a calculation is performed).

In some examples, application 204 adds an extra identifier to each data element in returned query results to allow for tracking what is displayed by browser 206. For example, a java template engine can be modified so that an extra identifier is provided for each returned object. Tester 212 can add, for example, JavaScript code that is executed by browser 206, causing browser 206 to identify and report all data elements from database 208 that are in the displayed results.

Figure 3:
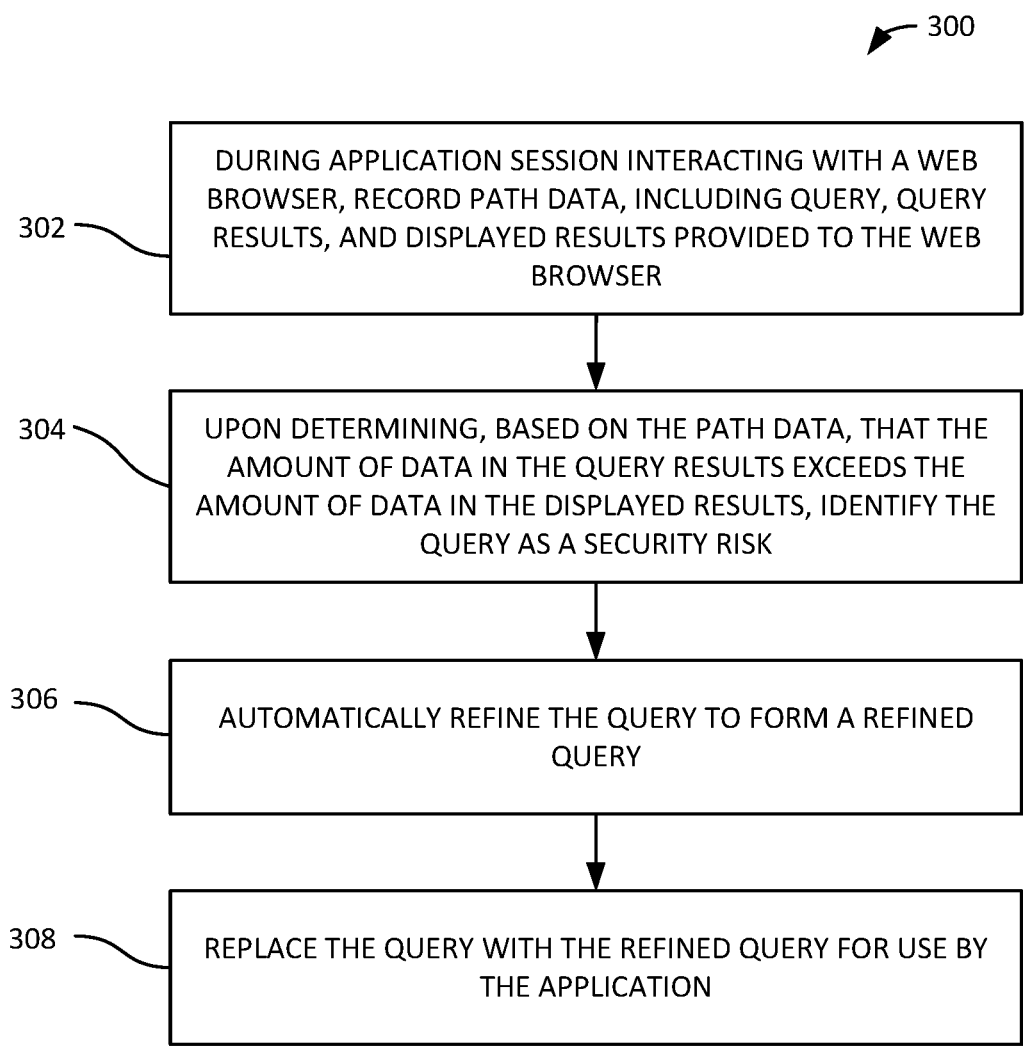
FIG. 3 illustrates an example method of securing data in which a query is replaced by a refined query.

FIG. 3 illustrates a method 300 of securing data in which a query is replaced by a refined query. In process block 302, during a session with an application in which a web browser interacts with the application and the application accesses a dataset, path data for the session is recorded. The path data comprises a query made to the dataset, query results for the query, and displayed results provided to the web browser corresponding to the query. In process block 304, upon determining, based on the path data, that an amount of data from the dataset in the query results exceeds an amount of data from the dataset in the displayed results provided to the web browser, the query is identified as a security risk. The query is automatically refined in process block 306 to form a refined query. The refined query returns less data from the dataset than the query. In process block 308, the query is replaced with the refined query for use by the application.

In some examples, prior to replacing the query with the refined query, the refined query is executed against the dataset and returned results of the refined query are compared with at least some of the path data (e.g., returned results of the query). In some examples, the refined query is refined. In such examples, second path data corresponding to the web browser interacting with the application and the application accessing the dataset via the refined query is recorded. Upon determining, based on the second path data, that the refined query is a second security risk, the refined query is automatically refined to form a second refined query and the refined query is replaced with the second refined query for use by the application. In some examples, upon determining, based on the second path data, that the refined query is a second security risk, a security alert is generated. The alert can be generated in addition to generating the second refined query.

FIG. 4 illustrates an example data security system 400 implemented on one or more server computer(s) 402 in which a browser 404 on a client computer 406 interacts with an application 408. Unlike system 200 in FIG. 2, browser 404 is on client computer 406, and tester 410 is not in direct communication with browser 404. Browser 404 interacts with application 408 through proxy 412, which queries dataset 414 through API 416. Dataset 414 can be a database or other data store. Similar to tester 212 in FIG. 2, tester 410 captures path data 418, including queries executed by API 416 against dataset 414, returned query results provided by API 416 to application 408, and information provided to browser 404 by application 408 via proxy 412. In some examples, proxy 412 is omitted.

Constructor 420 is similar to constructor 216 of FIG. 2 and refines queries identified by tester 410 as security risks. Refined queries can be executed against dataset 414 for verification or iterated refinement, and the results are stored in test data 422. In FIG. 4, browser 404 may be in control over what information it provides to tester 410, so tester 410 can rely on information provided by application 408 to browser 404 for display, and this information can be compared to returned query results. In some examples, a plug-in or other software may work in conjunction with browser 404 to provide displayed results information to tester 410. Such an arrangement allows an application provider to continue to test and refine queries used for various application operations after the application has been made available to users.

Figure 5:
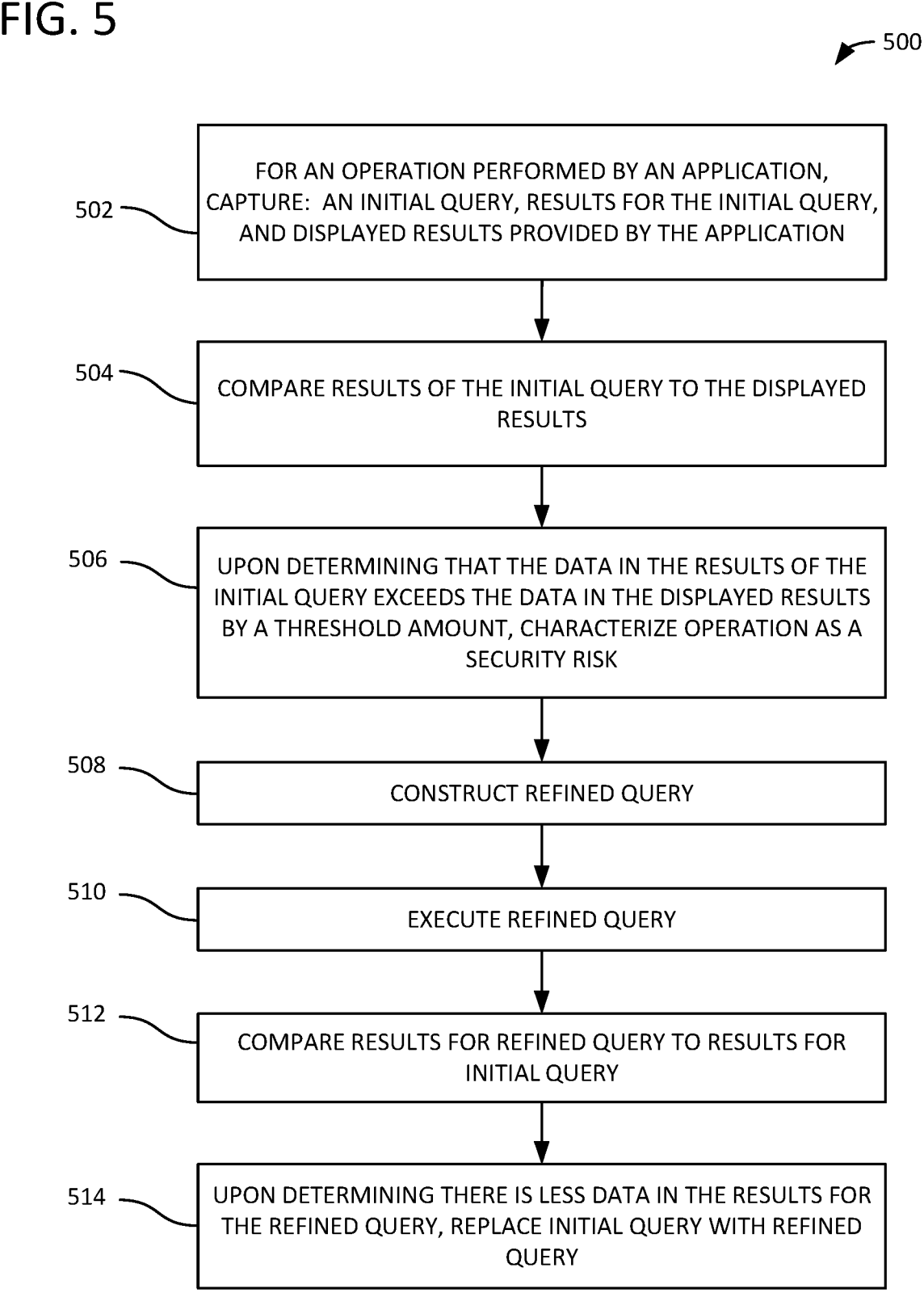
FIG. 5 illustrates an example method of securing data in which a refined query is executed against a dataset prior to replacing an initial query.

FIG. 5 illustrates an example method of securing data in which a refined query is executed against a dataset prior to replacing an initial query. In process block 502, for an operation performed by the application, an initial query associated with the operation and made against a database, results for the initial query from the database, and displayed results provided by the application for the operation are captured. The results of the initial query are compared to the displayed results in process block 504. The displayed results can be information provided for display (e.g., sent to a browser) or information gathered from display software (e.g., captured from a browser). In process block 506, upon determining that an amount of data from the database in the results for the initial query exceeds an amount of data from the database in the displayed results by a threshold amount, the operation is characterized as a security risk.

In process block 508, a refined query is constructed based on the initial query and the displayed results. In process block 510, the refined query is executed against the database. Results for the refined query are compared to results for the initial query in process block 512. Upon determining that an amount of data from the database in the results for the refined query is less than the amount of data from the database in the results for the initial query, the initial query is replaced with the refined query for use with the operation in process block 514.

In some examples, method 500 is iterative, and the refined query is further refined upon determining that the amount of data from the database in the results for the refined query exceeds an amount of data from the database in displayed results resulting from execution of the refined query. Iteration can proceed until the difference in the amount of data between results for a refined query and displayed results falls below the threshold, for a fixed number of iterations, or until no improvement is made between iterations.

Figure 6:
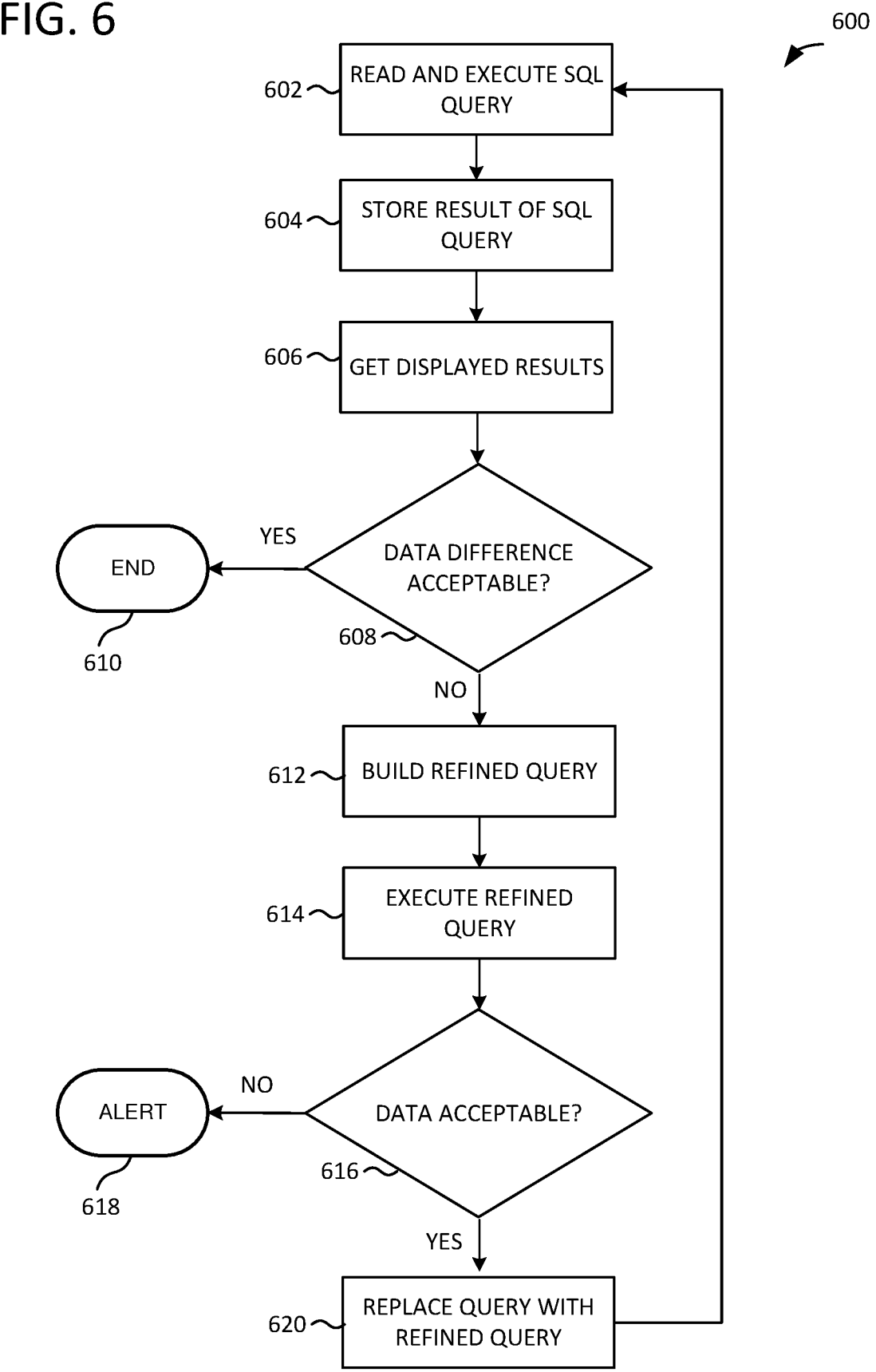
FIG. 6 illustrates an example iterative method of securing data.

FIG. 6 illustrates an example iterative method 600 in which queries are SQL queries. In process block 602, the initial query is read and executed. In process block 604, query results for the initial query are stored. Displayed results are obtained in process block 606 (e.g., as described with reference to FIGS. 1-5). In decision block 608, the displayed results and the results of the initial query are compared. If the difference in the amount of data is acceptable (e.g., zero or less than a specified threshold), method 600 ends and query refinement is not performed. If the difference is not acceptable, a refined query is built in process block 612 (e.g., as described with reference to FIGS. 1-5). The refined query is executed in process block 614. In process block 616, if the data in the results for the refined query is not acceptable, an alert is generated in process block 618. If the data is acceptable, then the initial query is replaced by the refined query. Data can be not acceptable, for example, because no data is returned, because data for multiple users that is not part of the displayed results is returned, etc.

After the refined query replaces the initial query, process 600 restarts, and the refined query is read and executed in process block 602, etc. Process 600 can end, for example, when decision box 608 indicates that the difference in the amount of data is acceptable, when decision box 616 determines that data is not acceptable, when a certain number of iterations have been performed, or when no improvement or improvement lower than a threshold is detected.

Example Computing Systems

Figure 7:
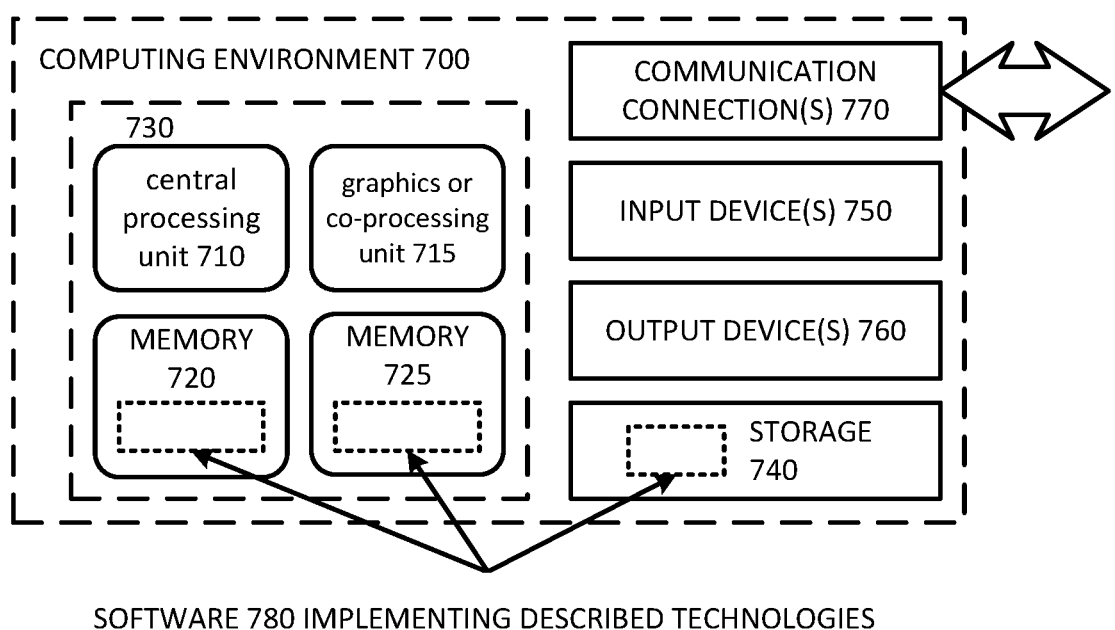
FIG. 7 is a diagram illustrating a generalized implementation environment in which some described examples can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, memory 720 and 725 can store tester 212, constructor 216, and other components of FIG. 2 and tester 410, constructor 420, and other components of FIG. 4.

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein. For example, storage 740 can store tester 212, constructor 216, and other components of FIG. 2 and tester 410, constructor 420, and other components of FIG. 4.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of securing data accessible by an application, comprising:
for an operation performed by the application via a first query to a dataset, capturing the first query;
capturing returned results of the first query;
capturing displayed results provided by the application for the operation;
comparing the returned results of the first query to the displayed results; and
upon determining that an amount of data from the dataset in the returned results of the first query exceeds an amount of data from the dataset in the displayed results by a threshold amount indicating a security risk, flagging the operation for query modification to reduce the amount of data from the dataset in subsequent returned results corresponding to the operation.

2. The method of claim 1, further comprising responsive to the flagging, based at least in part on the displayed results, modifying the first query to create a refined query.

3. The method of claim 2, further comprising replacing the first query with the refined query for use with the operation.

4. The method of claim 2, wherein the dataset is stored in a database, and wherein modifying the first query comprises modifying a SELECT command.

5. The method of claim 2, further comprising executing the refined query against the dataset and evaluating returned results of the refined query.

6. The method of claim 5, wherein the evaluating comprises comparing the returned results of the refined query to at least one of the returned results of the first query or the displayed results.

7. The method of claim 5, further comprising upon determining that an amount of data from the dataset in the results of the refined query exceeds the amount of data from the dataset in the displayed results by more than the threshold amount indicating the security risk, generating a security alert.

8. The method of claim 5, further comprising upon determining that the evaluating indicates that the security risk has been reduced, replacing the first query with the refined query for use with the operation.

9. The method of claim 8, wherein the refined query is a first refined query, and further comprising:
modifying the first refined query to form a second refined query; and
upon determining that results for the second refined query reduce the security risk, replacing the refined query with the second refined query.

10. The method of claim 1, wherein flagging the operation comprises transmitting a security alert to a developer associated with the application.

11. The method of claim 1, wherein the application is a web application, and wherein capturing the displayed results comprises parsing a web page to identify data from the dataset in the displayed results.

12. A system, comprising:
a processor; and
one or more computer-readable storage media storing computer-readable instructions that, when executed by the processor, perform operations comprising:
during a session with an application in which a web browser interacts with the application and the application accesses a dataset, recording path data for the session, the path data comprising a query made to the dataset, query results for the query, and displayed results provided to the web browser corresponding to the query;
upon determining, based on the path data, that an amount of data from the dataset in the query results exceeds an amount of data from the dataset in the displayed results provided to the web browser, identifying the query as a security risk;
automatically refining the query to form a refined query, wherein the refined query returns less data from the dataset than the query; and
replacing the query with the refined query for use by the application.

13. The system of claim 12, wherein the dataset is stored in a database, and wherein refining the query comprises narrowing a SELECT command.

14. The system of claim 12, wherein the operations further comprise prior to replacing the query with the refined query, executing the refined query against the dataset and comparing returned results of the refined query with at least some of the path data.

15. The system of claim 12, wherein the operations further comprise:
recording second path data corresponding to the web browser interacting with the application and the application accessing the dataset via the refined query; and upon determining, based on the second path data, that the refined query is a second security risk, automatically refining the refined query to form a second refined query and replacing the refined query with the second refined query for use by the application.

16. The system of claim 12, wherein the operations further comprise:
recording second path data corresponding to the web browser interacting with the application and the application accessing the dataset via the refined query; and
upon determining, based on the second path data, that the refined query is a second security risk, generating a security alert.

17. The system of claim 12, wherein recording the path data for the session comprises parsing a web page to identify data from the dataset in the displayed results.

18. One or more computer-readable storage media storing computer-executable instructions for securing data accessible through an application, the securing comprising:
for an operation performed by the application, capturing: an initial query associated with the operation and made against a database, results for the initial query from the database, and displayed results provided by the application for the operation;
comparing results of the initial query to the displayed results;
upon determining that an amount of data from the database in the results for the initial query exceeds an amount of data from the database in the displayed results by a threshold amount, characterizing the operation as a security risk;
constructing a refined query based on the initial query and the displayed results;
executing the refined query against the database;
comparing results for the refined query to results for the initial query; and
upon determining that an amount of data from the database in the results for the refined query is less than the amount of data from the database in the results for the initial query, replacing the initial query with the refined query for use with the operation.

19. The one or more computer-readable storage media of claim 18, wherein the securing is iterative and the refined query is further refined upon determining that the amount of data from the database in the results for the refined query exceeds an amount of data from the database in displayed results resulting from execution of the refined query.

20. The one or more computer-readable storage media of claim 18, wherein the initial query and refined query comprise Structured Query Language (SQL) commands, and wherein the results for the initial query and the results for the refined query comprise JavaScript Object Notation (JSON) files.

* * * * *